United States Patent [19]
Nicholas et al.

[11] 3,947,639
[45] Mar. 30, 1976

[54] SELECTIVE SWITCHING APPARATUS

[75] Inventors: David C. Nicholas, Cedar Rapids; Willard J. Torgrim, Springville; John C. Kleitsch, Cedar Rapids, all of Iowa

[73] Assignee: Rockwell International Corporation, El Segundo, Calif.

[22] Filed: Sept. 30, 1974

[21] Appl. No.: 510,534

[52] U.S. Cl. .......................... 179/1 CN; 179/18 BC
[51] Int. Cl.² ........................................ H04M 3/56
[58] Field of Search.... 179/1 CN, 15, 18 BC, 170.2, 179/170.4, 170.6, 170.8, 1 VC, 15 AA; 325/340, 304

[56] References Cited
UNITED STATES PATENTS

| | | | |
|---|---|---|---|
| 3,601,530 | 8/1971 | Edson et al. | 178/5.8 |
| 3,604,855 | 9/1971 | Pommerening | 179/18 BC |
| 3,699,264 | 10/1972 | Pitroda et al. | 179/18 BC |
| 3,755,625 | 8/1973 | Maston | 179/1 CN |

*Primary Examiner*—Kathleen H. Claffy
*Assistant Examiner*—Joseph Popek
*Attorney, Agent, or Firm*—Bruce C. Lutz; Robert J. Crawford

[57] ABSTRACT

A method and apparatus for providing improved telephonic conferences is presented. A speaker is selected for each conferee from the signals of the other conferees. The peak values of the speaker signal establish a variable reference level which another conferee must first exceed in order to become the new speaker and establish a new reference level. The reference level is continuously allowed to decay so that new speakers may gain the floor when the current speaker's peak signals fall below the peak signals of another speaker. Both an analog and a digital embodiment of the invention are presented.

6 Claims, 7 Drawing Figures

SELECTIVE SWITCHING APPARATUS

INTRODUCTION

This invention is related generally to electronics, more particularly to telephonic voice communication and switching, and specifically, to conferencing; that is, the creation of a telephone conversation involving three or more parties.

As is well known to those skilled in the art many techniques of a wide range of complexity are used to achieve telephone conference connections. In analog systems three-party conferences are frequently implemented by bridging the third party across an existing two-party circuit, while complex conference circuits are reserved for large conferences.

The advent of Pulse Code Modulation (PCM), digital voice transmission and switching systems has stimulated the development of new conferencing techniques which operate directly on the digital representation of voice. One important reason is that in PCM systems the simple technique of connecting the third party to an existing two-party call does not result in meaningful addition and mixing of the three digital signals as it does in the analog case, and thus in the digital implementation some sort of algebraic operation is required even for small conferences.

Conferencing techniques may be classified as additive or switched, and analog and digital mechanizations may be found in the prior art for both approaches.

In the additive technique each conferee receives the algebraic sum of the signals of the other conferees. In the switched technique an attempt is made to discover which conferee is the speaker. The speaker's signal alone is then sent to the other conferees, while the speaker may receive either a zero signal or the signal from the previous speaker. Alternatively, in a new approach a speaker may be selected for each conferee from the traffic offered by the others excluding that conferee's own signal. In this scheme the actual speaker hears some "speaker" chosen from the idle conferees. In addition to permitting any conferee to interrupt the current speaker, this approach offers certain hardware advantages discussed later.

Analog conference techniques have most often been basically additive.

Digital approaches may be additive or switched. Berch in a U.S. Pat. No. 3,551,600 issued Dec. 29, 1970, has reported a straightforward implementation in digital form of the additive technique.

In the digital environment additive techniques suffer from three difficulties. First, the range of amplitude levels must be bounded, and while each conferee's signal may stay in bounds, the sum may not. Pommerening in a U.S. Pat. No. 3,604,855 issued Jan. 2, 1970, deals with this problem.

A second difficulty with additive schemes is that the compressed (pseudo-logarithmic) digital representation utilized by all common PCM systems must first be converted to linear representation before the addition can be performed, and then the result must be reconverted. These conversion and reconversion steps can be avoided by utilizing a switched technique which operates directly on the compressed representation to select a speaker. The switched approach also avoids a third difficulty common to both digital and analog realization of the additive approach which is the presence in the resulting sum of not only the speaker's signal but also the combined idle channel noise from the channels of all of the silent conferees.

For these reasons, the switched approach has most often been proposed for digital conferencing circuits, but the known prior art has several deficiencies.

Goodall, et al, in a U.S. Pat. No. 3,508,007 issued Apr. 21, 1970, have disclosed a digital switched conference circuit which determines that a conferee is speaking when that conferee's signal exceeds a fixed threshold. In the event that two or more are speaking, contention for the floor is resolved by designating one conferee as chairman. The chairman gets the floor as soon as his speech is detected pre-empting any other speaker if necessary. Other speakers get the floor provided the chairman is not speaking. The first of the other speakers to get the floor may hold it as long as desired, and other conferees except the chairman are locked out.

In this approach speech detection is accomplished by determining if a conferee's signals exceed a predetermined threshold. This task may be accomplished by analog or digital techniques and may or may not include filtering to eliminate noise bursts. The strict protocol for gaining the floor eliminates the necessity for determining which is the louder of two speakers and prevents rapid switching back and forth between speakers. This is accomplished at the expense of preventing entirely the ability of speakers except the chairman to interrupt other speakers. The ability to interrupt exists in additive conference circuits, some switched conference circuits, and face-to-face conversation. The designation of a chairman who may preempt the floor and poll conferees who may have unsuccessfully attempted to break-in only partially alleviates the problem. In most conferences set up through an automatic switching system the chairman would of necessity be designated in an arbitrary fashion with no relation to the person who might actually be the most appropriate to chair the conference.

A potentially superior algorithm known as Instant Speaker has been disclosed by Pitroda, et al., in U.S. Pat. No. 3,699,264 issued Oct. 17, 1972. In the simplest embodiment of this approach a set of samples consisting of one sample from each speaker is examined. The largest amplitude sample is designated as the speaker and that sample is retransmitted to all the conferees with the exception of the speaker from which it came. The speaker receives the sample from the conferee who was previously the speaker. Each time a new conferee becomes the speaker the identity of the old speaker is stored away for this purpose, and only this information is retained from frame-to-frame. In a superior embodiment of the Pitrode et al. invention, the current speaker is also stored from frame-to-frame. Then, only the most significant few bits of each conferee's samples are used for comparison, resulting in many "ties." Ties are then broken in favor of the current speaker resulting in less frequent switching from one speaker to another.

This approach, while satisfactory in an ideal environment, suffers from an inability to distinguish reliably between the speaker, and the speaker's echo arriving via a different path. Echo, that is reflected signal, is present in all telephone systems except those which provide separate paths for transmission and reception from end-to-end on each connection. Such systems are referred to as four-wire systems. Two-wire systems utilize a common path for transmission in both directions. The existing telephone system is a mixed system with long-distance transmission, and switches, and digital transmission and switching whatever the distance, generally implemented on a four-wire basis, while local distribution is accomplished on a two-wire basis. Echo occurs at the hybrid circuit, which is the two-wire to four-wire conversion point, due to impedance mismatch between the two and four-wire circuits. This mismatch is unpredictable and variable, and therefore it is impractical to provide sufficiently precise compensation at each point to eliminate echo entirely.

Conference circuits in telephone systems must therefore cope with the echo present. Because human tolerance to echo is quite high, elaborate procedures for suppressing echo are not normally required or provided in telephone systems, except for very long distance transmission, and therefore considerable echo is present in most telephone connections, although it is frequently not perceived by the user.

The performance of the Instant Speaker approach has been evaluated under echo conditions which might normally be expected. Because of the delay between the arrival time of the signal and the echo, at many instants the echo will have a larger value than the signal of the speaker received directly. Algorithms which determine the speaker on an instantaneous basis will often incorrectly choose the speaker echo rather than the true speaker. The resulting switching back and forth between speaker and speaker echo occurs so rapidly that the result is perceived by the ear to be distorted and noisy.

A fixed threshold cannot be utilized in practical systems to separate speaker and speaker echo due to the uncertainty in transmission level present in practical systems.

It is, therefore, an object of the present invention to provide an improved conferencing concept and method and apparatus for practicing same.

Other objects and advantages of the present invention may be ascertained from a reading of the specification and appended claims with the drawing wherein:

Figure 2:
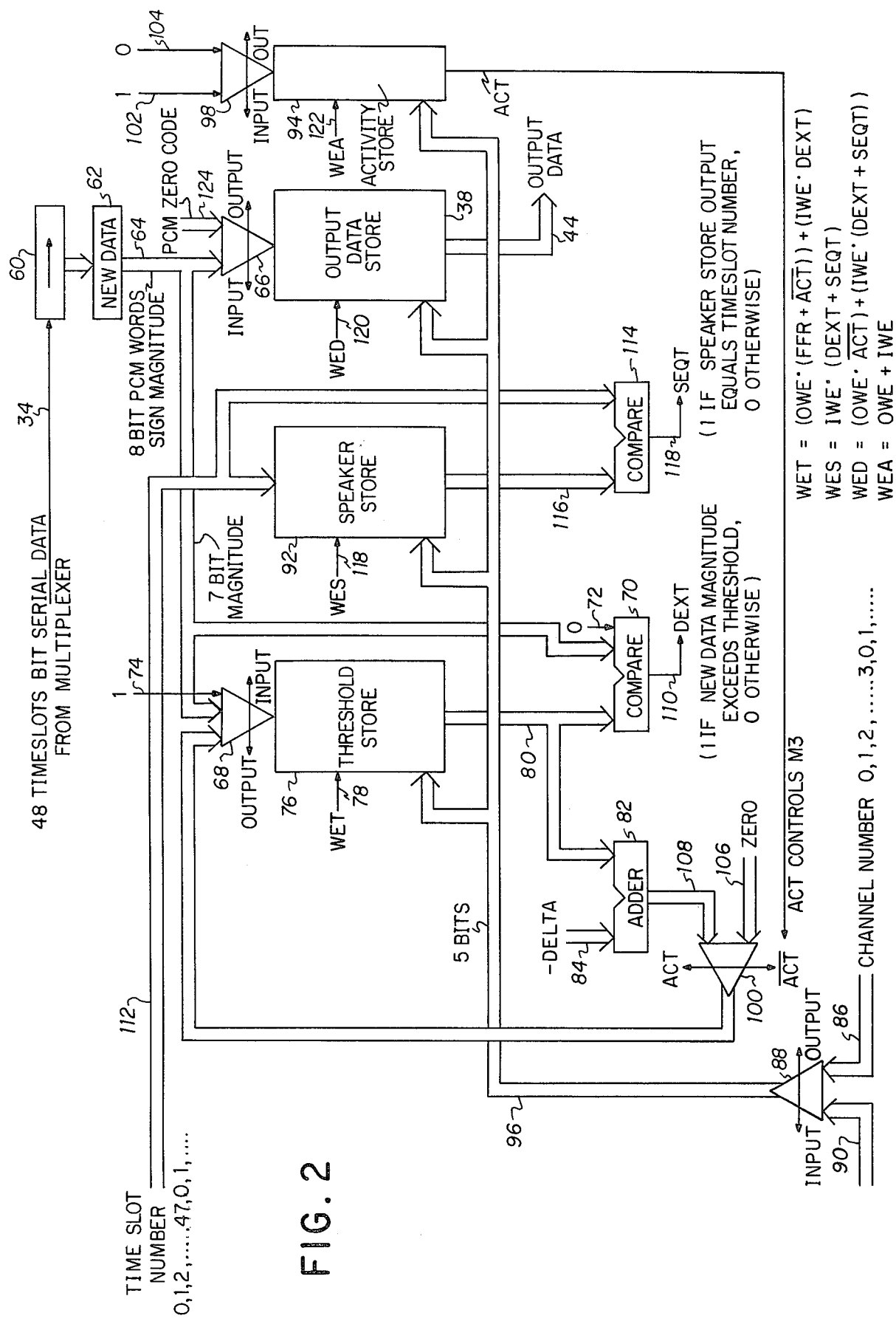
FIG. 2 is a block diagram of a digital version of a conferencing circuit.
Figure 3:
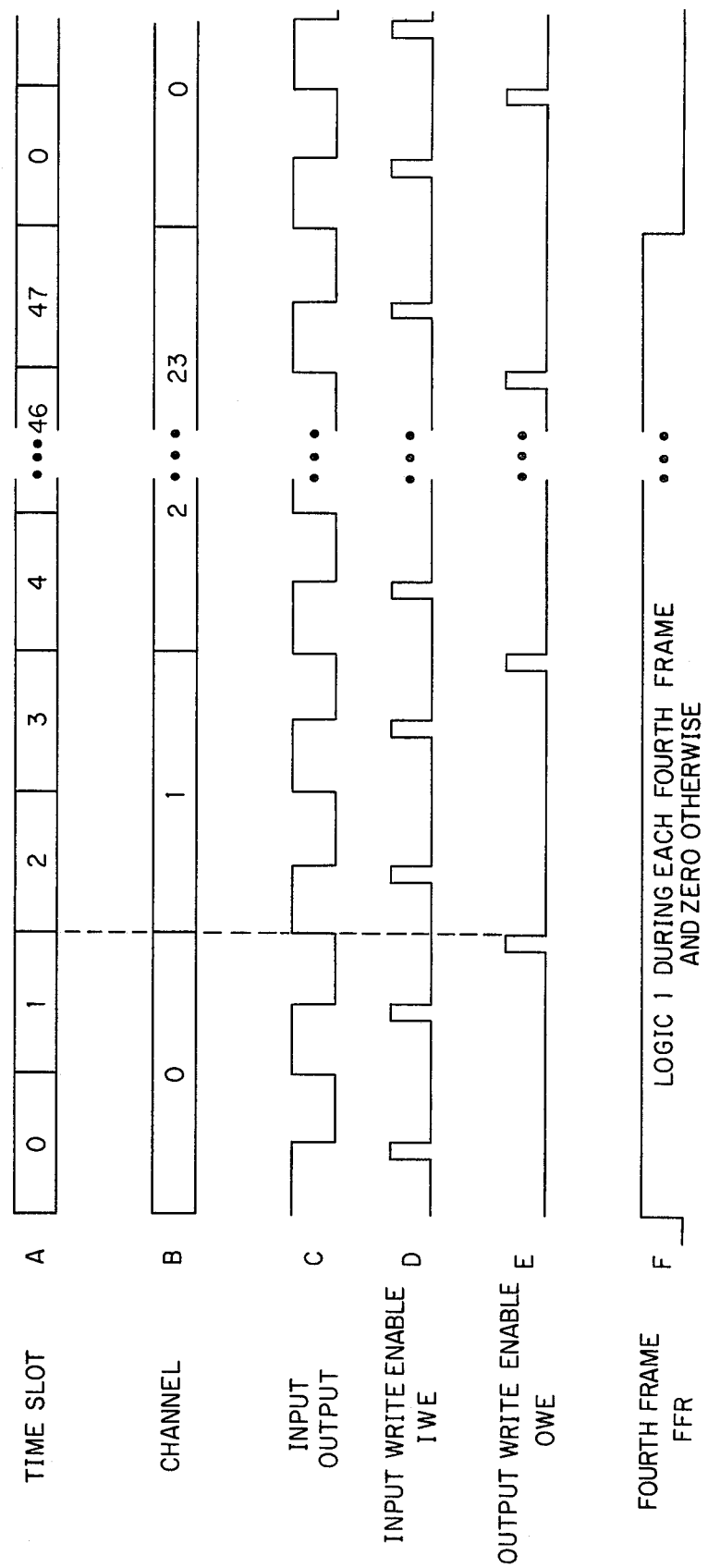
Figure 4:
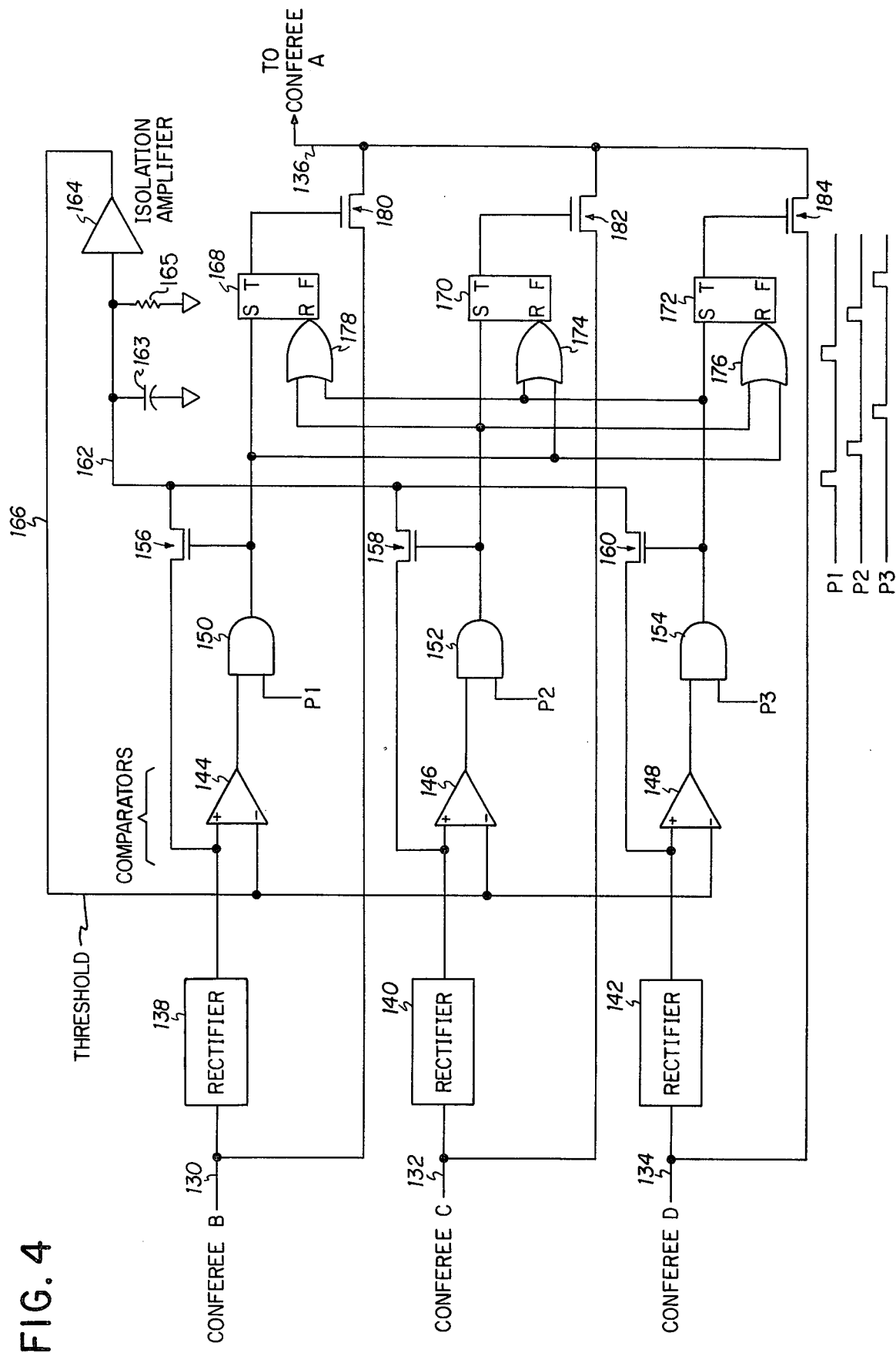
Figure 5:
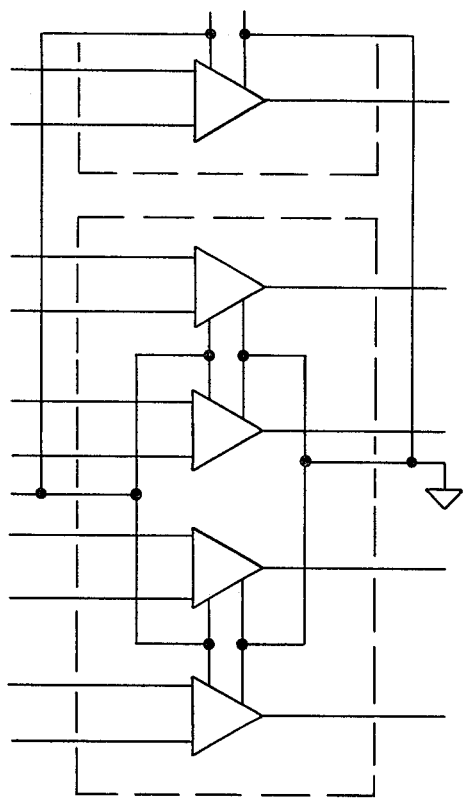
Figure 6:
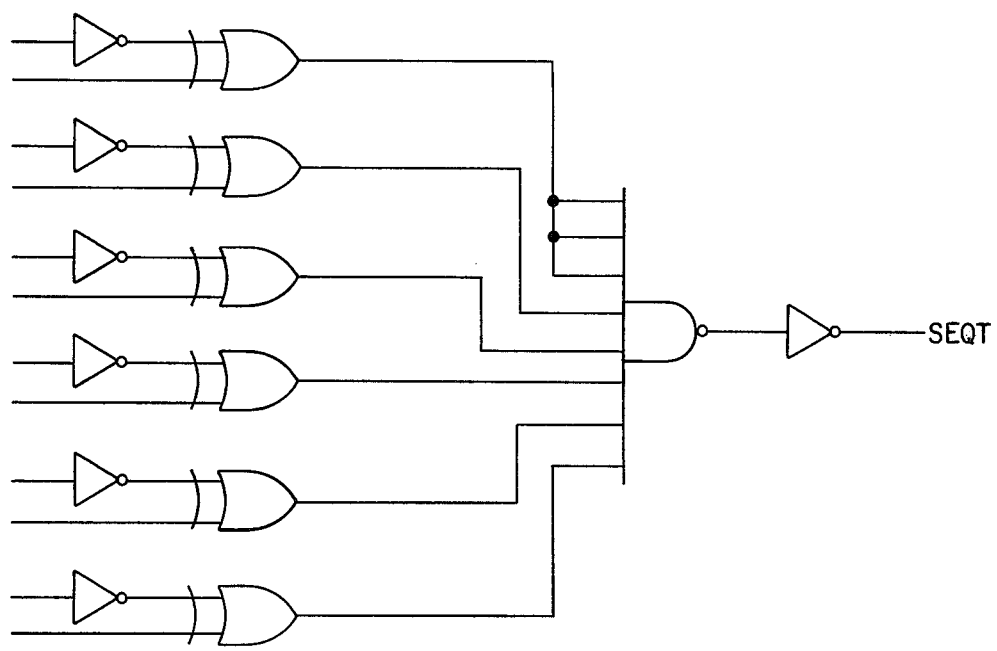
Figure 7:
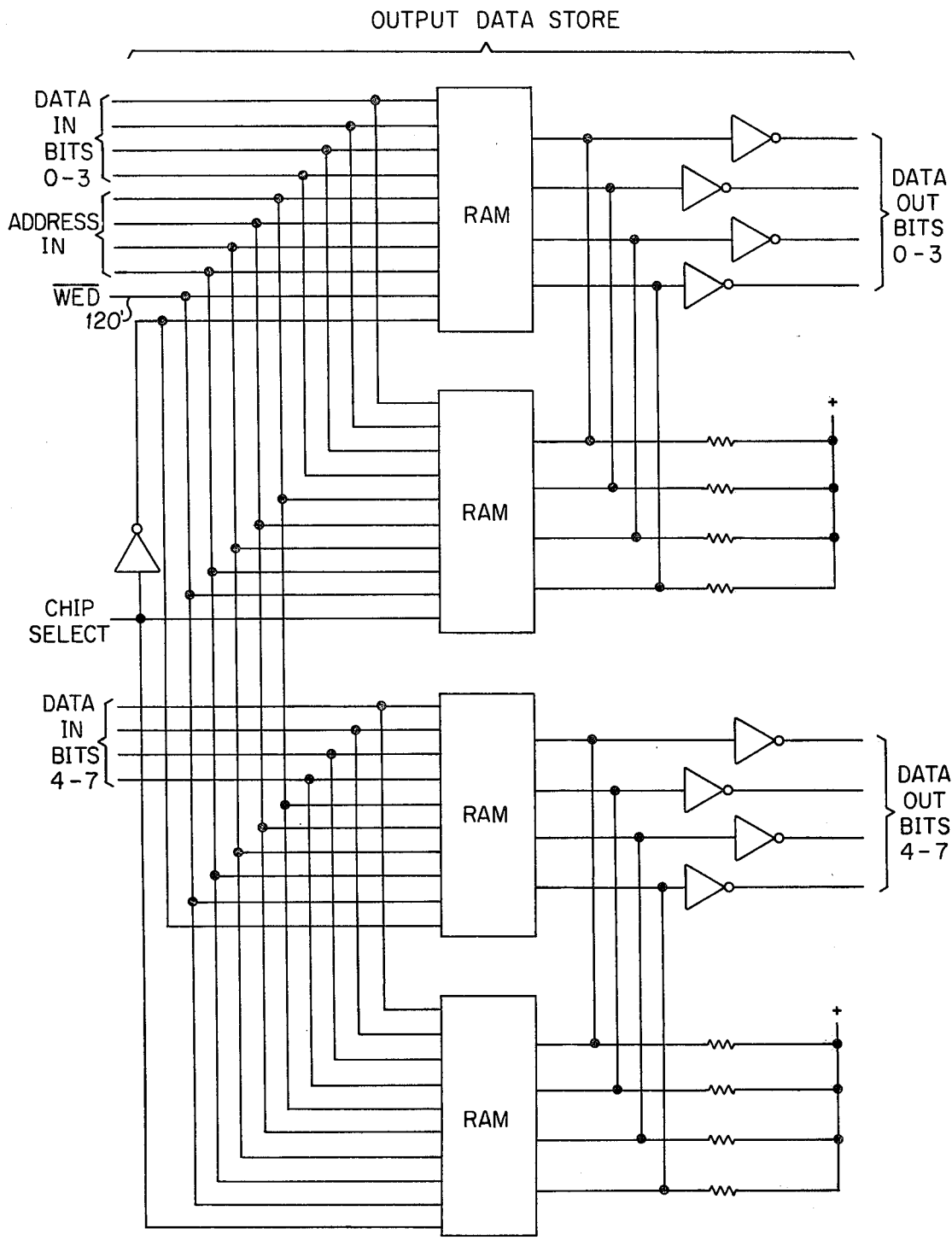

FIG. 3 contains a plurality of timing diagrams for use in explaining FIG. 2;

FIG. 4 illustrates an analog version of the inventive concept illustrated in FIG. 2;

FIG. 5 provides a detailed block diagram of one of the multiplexers in FIG. 2;

FIG. 6 illustrates a detailed block diagram of a typical comparator circuit in FIG. 2; and FIG. 7 provides a detailed block diagram of a typical data storage device of FIG. 2.

The present invention is an improved switched conferencing technique in which a speaker is selected for each conferee from the signals of all the other conferees.

This selection is made by comparing the amplitude or magnitude of the offered PCM samples (or comparing the analog signals in the analog implementation) against a reference level. For the purpose of this application, the term magnitude is intended to include both the absolute arithmetic value of a binary word for a digital system and the amplitude of an analog signal in an analog system. Whenever any signal exceeds the reference level then the value of that signal becomes the new reference level, and that speaker becomes the new speaker or continues as speaker. The signals of the speaker are then forwarded to the listener, and the other offered signals are excluded.

The reference level is continuously diminished at a fixed rate so that new speakers may gain the floor. The rate is set so that the reference level does not significantly diminish during the time required for an echo to return. Thus, so long as the peaks of the speaker's echo or echoes are even slightly smaller than the peaks of the speaker's signal, which is always the case, switching between speaker and speaker echo will not occur.

FIGURE 1

The conferencing method presented here was developed as part of a PCM voice switching system and is practiced in that system in digital form, but an embodiment in analog form is presented as well. In order to lay a foundation for the description of the digital embodiment a brief description of the digital switching system, shown in FIG. 1, will first be given. The digital embodiment of the conference circuit is in fact an integral but localized part of the digital switch; thus, only a general understanding of the entire switch is required in order to provide a foundation for understanding the conference circuit.

The switch in which the conference circuit is imbedded is a three-stage, time-space-time, PCM, switching system which directly connects to D2 format, T1 carrier PCM, multiplex trunks which in turn terminate in ordinary PCM multiplex units commonly referred to as channel banks. Many of the detailed features of this switch are novel, but the overall organization is familiar to those skilled in this art, and a detailed disclosure of the entire switch is not required to understand the operation of the conference circuit.

Figure 1:
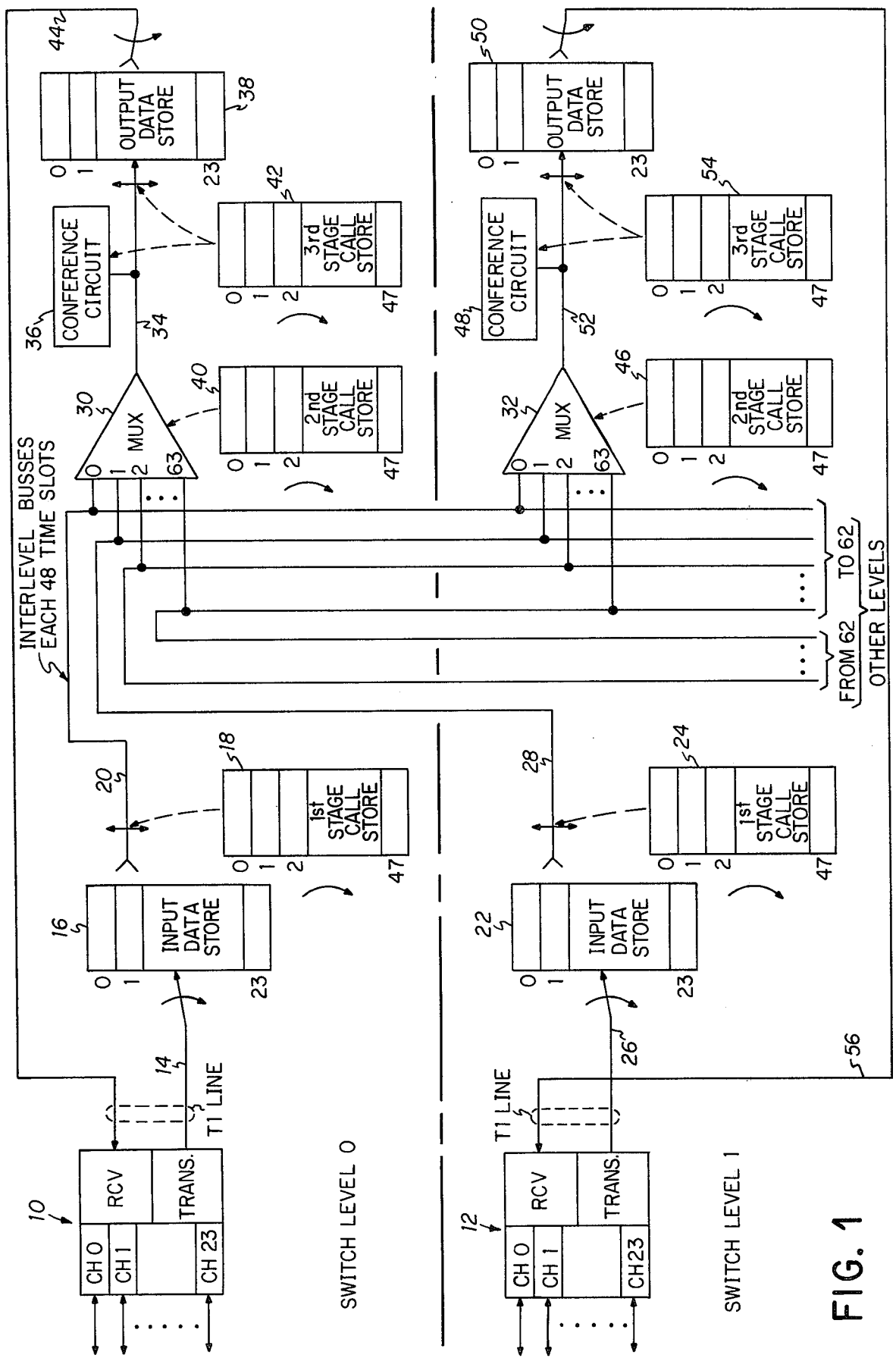
FIG. 1 is a block diagram of an overall switching network including a conferencing circuit in a third stage thereof.

FIG. 1 illustrates two of up to 64 modules of the switch. In FIG. 1, each switch module and its associated channel bank are referred to as "levels", and level 0 and level 1 are shown. Up to 64 levels may be implemented using the equipment type illustrated.

Referring to FIG. 1 switch level 0, which will be described first, consists of a channel bank unit 10 which terminates 24 voice circuits or channels numbered 0 through 23. The channel bank unit consists of two parts. The transmit section sequentially samples each voice circuit, converts the analog sample to an 8 bit PCM digital representation, and sequentially transmits the samples from each circuit over the transmit half of a T1 PCM multiplex trunk 14 to the switch module. Within the switch module the received samples are demultiplexed and stored in an input data store 16, with 24 locations labeled 0 through 23 so that the digitized voice samples from channel 0 are stored in location 0, the samples from channel 1 in location 1, etc. A new sample simply overwrites the old sample, but by the time it is overwritten the old sample has already been forwarded through the switch as will be understood presently.

The output section of the switch module and receive portion of the channel bank generally perform the reverse function of that just described. That is, the switch module also has an output data store 38 having twenty-four locations numbered 0 through 23. PCM samples to be transmitted to a particular voice channel of the channel bank associated with module or switch level 0 are conveyed by the switching process described below to the output data store location of the same number as the channel for which they are intended. They are then multiplexed in numerical order onto the second half of the T1 PCM multiplex trunk 44 and transmitted to the receive section of the channel bank 10, where they are demultiplexed, converted to analog form, and sent to their designated voice circuit.

A second switch level, level 1, is also illustrated in FIG. 1 consisting in part of channel bank 12, T1 line to the switch 26, input data store 22, output data store 50, and T1 line 56 from the switch to the channel bank 12. Operation of both levels is similar.

The switching process then consists of moving PCM digital samples from the input data store location associated with the transmitting line to the output data store location associated with the receiving line. This process must be continuous so that data arrives, flows through the switch and out again without inserting or deleting samples.

In order to accomplish this each output data store input is connected to a multiplexer which in turn has access to the input data stores of all 64 levels, through an interlevel bus of 64 circuits.

Thus, the output data store 38 of level zero is fed through multiplexer 30, and the output data store of level 1 is fed through multiplexer 32. Each multiplexer has the same inputs consisting of a single circuit from the outputs of each of the 64 input data stores. The outputs of the input data stores of levels 0 and 1 are shown explicitly and designated circuits 20 and 28 respectively, and these go to the first two of 64 inputs of each multiplexer numbered 0 through 63, so that the output of the level n input data store appears at the nth input of each multiplexer where n ranges from 0 through 63.

Thus, it can be seen that by means of its associated multiplexer the input of any level's output data store may be connected to the output of the input data store in any of the 64 levels, and the required data transfer between input data store and output store can be made for any input channel of any level to any output channel of any level.

In order to accommodate more than one call on a given level, the interlevel bus and multiplexers are utilized on a time division basis in which during the time that a full set or frame of 24 samples are received and transmitted on the T1 trunks, 48 transfers may take place on each circuit. The data which are placed on the input data store output circuit, the multiplexer connection, and the output data store location into which the data received from the multiplexer are placed are controlled by three call stores of 48 words each in each level. The connections during each of the 48 time slots designated 0 through 47 are controlled by the corresponding locations in the call stores. This three-step switching process provides the rationale for referring to the entire device as a three-stage switch.

In level 0 the first stage call store 18 controls the data placed on circuit 20 from input data store 16 during each time slot. The second stage call store 40 controls the multiplexer 30 and thus determines from which of the 64 input data stores data will be selected to flow through to the output data store 38. Finally, the third stage call store 42 determines the output data store location into which the data will be placed.

The level 1 first stage call store 24, second stage call store 46, and third stage call store 54 serve these same functions in level 1.

All levels are kept in synchronization by a common clock so that the same time slots occur in each level at the same time.

The data in call stores are utilized in a rotary fashion so that the entire process is repetitive. Thus, a particular data transfer path during a particular time slot provides a one-way circuit for the PCM voice samples, and communication may take place. The normal two-way circuit requires two one-way connections. Each one-way connection requires an entry in the location corresponding to the same time slot in the source level first stage call store and in the destination level second and third stage call stores.

The present invention is not concerned with the overall switch concept. The overall switch concept is adequately illustrated in various Bell Telephone Laboratories publications as well as patents issued to the assignee of the present invention and others. Neither does this disclosure describe possibly novel but unclaimed details of the switch shown in FIG. 1. However, an important feature of the switching system illustrated in FIG. 1, and similar systems, is that several inputs may be directed to the same output. Thus, inputs A and B might be directed to C. In this case, the third stage call store in the level handling voice channel C will have two entries corresponding to C. If a conference circuit block 36 of level 0 and block 48 of level 1, is interposed between the multiplexer and output data store in each level then conferencing may be accomplished. The conference circuit has access to the third stage call store and recognizes data directed to the same output location by similar entries in that store.

Data from several conferees' inputs directed to the output data store location of the receiving conferee may be combined according to any of several additive or switched conferencing techniques.

Four similar switch connections from B and C to A; and C and A to B complete a three-party conference. Larger conferences may be implemented in the same fashion but more connections are required. The improved conferencing method and apparatus of this disclosure were reduced to practice for use in such a switch as is described above, but may obviously be applied in other situations as well.

DIGITAL CONFERENCING CIRCUIT IMPLEMENTATION

In FIG. 2, the conferencing circuit 36 and output data store 38 of FIG. 1 are illustrated in more detail. As may be noted, the input line to the circuit provides 48 time slots of bit serial data from the multiplexer. Applying this to FIG. 1, this could be the line 34 receiving data from multiplexer 30. The output data store 38 of FIG. 1 is also designated as 38 in FIG. 2. Finally, the output lead of the output data store 38 is also designated as 44 as it is in FIG. 1. The parallel to serial conversion and modulation circuits which would be required to transmit the data on bus 44 to the PCM channel bank are not related to the present invention and are not shown. The additional detail is provided in having a serial input to parallel output block 60 receiving the data on line 34 and supplying this to a temporary register 62. Register 62 holds the inputted data until utilized by the circuit and during which time the block 60 is receiving additional serial bits. The output of block 62 is an eight-bit parallel output on bus 64 to multiplexer. The seven-bit magnitude portion of the eight bit sign magnitude sample on bus 64 is also fed to the most significant seven bits of the eight bit multiplexer 68 and compare circuit 70, the least significant bit position is filled with a logic 1 in the first case and a logic 0 in the second case as indicated by leads 74 and 72. This arrangement permits decrementing the threshold by one-half step and will be more fully explained later. An output of multiplexer 68 is supplied to a threshold store block 76 having a control input 78 labeled WET. WET, as shown elsewhere in FIG. 2, is a logic 1 upon the occurrence of an output write enable (OWE) signal combined with either a fourth frame signal (FFR) or a no-activity bit ($\overline{ACT}$), or in the alternative is actuated to a logic 1 upon the occurrence of an input write enable (IWE) simultaneous with a data exceeds threshold (DEXT) signal. An output 80 of threshold store circuit 76 is applied in parallel to the compare circuit 70 as well as to an adder circuit 82. The adder circuit 82 has a further input 84 labeled minus delta (-DELTA). A bus 86 provides channel number inputs in parallel to a multiplexer 88. The multiplexer 88 has a further input as obtained from a third stage call store such as 42 of FIG. 1 on a bus 90. These inputs again are in parallel form and represent a specific address determining the location accessed in one or more of the random access memories or stores such as 76 and 38. Additional random access memories are the speaker store 92 and an activity store 94. An output 96 of the multiplexer 88 is connected to each of these storage devices. The multiplexers 68 and 88 as well as additional multiplexers 66 an 98 are actuated between one input and the other in accordance with a control input labeled input/output. This signal is illustrated as timing diagram C in FIG. 3 and the multiplexer is in the input condition when the signal C of FIG. 3 is in logic 1 and is in the output condition when this signal is a logic 0. In FIG. 3 and FIG. 4 a high waveform level represents a logic 1 and a low level represents a logic 0.

While the other multiplexers are operated between one input and the other with the input/output signal, multiplexer 100 is operated according to the presence (ACT) and the absence ($\overline{ACT}$) of an activity signal. The activity signal is dependent upon whether or not there is a logic 1 at the output of activity store block 94. The inputs to multiplexer 98 are a logic 1 on lead 102 and a logic 0 on lead 104. The multiplexer 100 receives a binary zero code input on lead 106 and an input from adder 82 on a lead 108. The compare circuit 70 provides an output on lead 110 indicative that the data magnitude on bus 64 exceeds the threshold on threshold memory output 80. A lead 112 provides the time slot number inputs in six bit parallel form to the speaker store 92 as well as to compare circuit 114. An output of speaker store 92 is supplied as a further parallel input to compare circuit 114 on bus 116. An output 118 of the campare circuit is labeled SEQT and is indicative of speaker store output equals time slot number. The speaker store 92 has a control input 118 labeled WES. The condition under which this input becomes a logic 1 to control the speaker store block 92 are further indicated elsewhere in this Figure. A similar input 120 controls the output data store 38 and is labeled WED, and a final control input 122 controls the activity store block 194 under the label WEA. A PCM zero code input is supplied to multiplexer 66 on a bus 124.

Referring now to FIG. 3, it will be noted that the timing diagram in line A illustrates the time period of various slots during which valid input data is present in the NEW DATA register 62. During this time the binary value of the number of the time slot 0, 1, 2 . . . etc. is provided on bus 112. Line B of FIG. 3 shows time periods which are twice as long and indicate time slots during which each of the twenty-four output words will be transmitted. As previously indicated in conjunction with the description of FIG. 1, each switch module handles a multiplexed trunk of 24 voice channels, and provides 48 time slots during which the 24 channels may be switched.

The waveform 3C provides an illustration of the logic values of the input/output signal which controls many of the multiplexers of FIG. 2 such as block 68.

The waveform D in FIG. 3 illustrates the input write enable IWE circuit signal. Note that the positive pulses occur near the end of the input interval during which waveform C is high. The logic 1 pulses of waveform E occur near the end of a channel time and occur near the end of the output interval of waveform C.

The final waveform in FIG. 3 is a fourth frame pulse which becomes logic 1 during each entire fourth frame of 48 time slots and remains in a logic 0 for the next 144 time slots.

FIG. 2 is equally well representative of the conference circuit 48 and output data store 50 of level 1 shown in FIG. 1. Each switch level is substantially identical to the others.

OPERATION OF FIG. 2

The operation of FIG. 2 may best be understood by first referring back to FIG. 1 and noticing that if FIG. 2 illustrates a portion of level 0 comprising the conference circuit 36 and output data store 38 of FIG. 1, then FIG. 2 receives and appropriately conferences all data which will ultimately be transmitted to the channel bank of that level and its 24 connected subscribers via a line such as 44. In FIG. 1 a connection is shown between the conference circuit 36 and output data store 38 and the third stage call store 42. The latter connection is via bus 90 to multiplexer 88 of FIG. 2.

The operation of the circuit shown in FIG. 2 may best be understood by first reviewing the conference algorithm and the functions of the major blocks of FIG. 2.

During each of 48 incoming time slots, 8 bits of sign-magnitude PCM data appear in register 62 after serial to parallel conversion. At the same time the third stage call store, block 42 of FIG. 1, provides via bus 90 of FIG. 2 five bits of address information in the range of 0–23 which specifies into which of 24 output data store locations the new PCM data shall be placed. An essentially independent but time interleaved operation periodically removes this data from the output data store and places it in the time slot corresponding to its storage location address on bus 44 for transmission to the channel bank. The operations just explained are essentially the only operation which would be required if conferencing were not implemented. In that case no more than one of the 48 incoming time slots would normally have data for any given output storage location.

Conferencing is implemented by directing to the output data store location of each conferee the data from each of the other conferees in the conference. Thus, several of the 48 incoming time slots in the case of a conference will have data directed to the same output.

The function of the conference circuit is to choose the data from the speakder from among the several conferees' signals presented in the different time slots directed to a particular output. Notice that the various conferees may be distinguished by means of the time slot number on which the data appears.

The present invention identifies the speaker as that signal with the largest peak amplitude value. That value becomes a threshold, and that party remains the speaker until another conferee's signal provides a peak which exceeds the threshold at which time the speaker designation changes to that conferee. If the speaker supplies a signal larger than his own currently stored threshold value, then the threshold is increased to correspond to the new peak and that party continues as speaker. On the other hand, in order to permit another conferee to become the speaker when the current speaker finishes speaking, the stored threshold is periodically diminished. This diminishing process occurs at a rate sufficiently slow that the threshold does not significantly decrease during the time required for a speaker echo to return, but sufficiently fast that a new conferee can become the speaker quickly when the original speaker is in fact finished.

In order to implement this algorithm FIG. 2 shows three substantially similar random access memories each having at least 24 locations capable of storing binary data words. The active or selected location is determined by a five bit address supplied on bus 96. These memories are identified as the threshold store 76, speaker store 92, and output data store 38. The contents of the currently addressed location are presented in parallel on memory output busses 80, 116, and 44, respectively.

The memories also have inputs from multiplexer 68, bus 112, and multiplexer 66, respectively, as illustrated in FIG. 2. Data present on the input will be written into the currently addressed location in each memory if a write pulse is provided. The write pulse inputs of the three memories are WET, 78; WES, 118; and WED, 120. The required width of the words in these memories in this specific application is 8 bits in the threshold store, 6 bits in the speaker store, and 8 bits in the output data store. A memory similar in function but requiring 24 words only one bit wide is the activity store 94, also addressed by bus 96 and having an input from multiplexer 98, an output on line ACT and a write pulse input WEA, 122.

The function of the output data store 38 remains essentially that which has been extensively described above; that is, storage of output data prior to multiplexing into bus 44.

The function of the speaker store 92 is to store a six bit word in the range 0–47 for each of the twenty-four output channels which identifies the current speaker.

The function of the threshold store 76 is to store an 8-bit word for each of the 24 output channels which specifies the magnitude of the current threshold which must be exceeded to change speakers on that output.

The function of the activity store 94 is to store a one-bit word for each of the twenty-four channels. This bit is set to a ONE each time the corresponding address in the output data store is written and is set to ZERO each time that data is subsequently transmitted to the channel bank. Thus, when a connection is broken and activity ceases ACT remains a ZERO, and this condition is utilized to immediately reduce the threshold to zero. This last feature represents refinement which permits a subsequent conference to immediately establish its own threshold without first exceeding the threshold left over from the previous conference. The old threshold would be reduced to zero through the normal diminishing process in any event. By studying the timing diagram FIG. 3, and the notes and logic equations which are included in FIG. 2, those skilled in the art will understand the operation of the circuits of FIG. 2 with relatively little explanation. Those skilled in the art will readily understand the construction of combinational logic circuits necessary to derive the WET, WES, WED, and WEA signals, and such circuits are not shown in the interest of clarity as the equations shown in FIG. 2 are believed to be more readily understood.

During the input or first half of each of the 48 time slots new data is directed from register 62 through multiplexer 66 to the appropriate address in the output data store 38 as specified by the output of the third stage call store, 42 of FIG. 1, which is transmitted via bus 90 through multiplexer 88, and then via bus 96 to the memories.

Data from multiplexer 66 may or may not be written into the output data store as controlled by signal WED, 120, which is in turn defined by the logic equation shown in FIG. 2.

At this same time compare circuit 114 compares the current speaker for the specified output channel and output data store location, available at the output 116 of the speaker memory, with the present time slot number specified on bus 112. If they are equal as indicated by a logic ONE at lead 118 of compare circuit 114 output SEQT, then the new data are written into the output data store. This will be referred to as the first case.

In addition, even if the present time slot and current speaker are not the same, data may be written if the output DEXT, 110, of compare circuit 70, is a ONE indicating that the amplitude of the new data exceeds the currently stored threshold for that channel. This will be referred to as the second case.

Thus, as can be seen from the equation for WED, new data will be written in the first or second case or both, and as can be seen from the equation for WES, the speaker store will be written with the present time slot number as well. In the second case, but not the first case, as can be seen from the equation for WET, the new data will be stored as a new threshold as well.

Case 1 alone is the situation in which the new data are from the current speaker, but the new data amplitude is not larger than the current threshold.

Case 2 alone is the case in which the data from the new speaker exceeds the current threshold and a new speaker is designated.

Case 1 and 2 occurring together correspond to the current speaker exceeding his own threshold.

If neither of the two cases above occurs, then the new data are not written and are effectively discarded, because the data are not from the current speaker and also the amplitude does not exceed the threshold so a new speaker is not designated.

It can readily be seen that for two-party, non-conference calls in which only one time slot carries data for a given output location the speaker is always the same and thus no special disabling circuits are required to disable the conference circuitry, and the conference circuit handles a two-party call as a trivial conference call.

The behavior of the circuit during input operations has been described. During output operations, as designated by waveform C, meaningful activity occurs only half as often or once per channel period, as shown by waveform E, signal OWE. In the case of input operations discussed previously meaningful activity occurred during each time slot as shown by waveform D, IWE.

During input operations and output operations, that is, at every opportunity the activity store is written, but with a ONE during input operations and a ZERO during output operations. Thus, when activity ceases and no time slots carry data for a given output location, the value for that location in the ACT memory becomes and remains ZERO.

During output operations multiplexer 88 supplies the channel numbers of the output channels 0–23 to the memories via bus 96 and data is output from the corresponding location in the output data store on bus 44.

Also, during each channel output time during each fourth frame as indicated by waveform E of FIG. 3, the threshold stored for the currently specified channel is decremented by an amount DELTA through the action of adder 82, and returned via bus 108, multiplexer 100, and multiplexer 68 to the threshold store, if there is activity in that channel as indicated by the output of the activity store ACT at ONE, data is written into the threshold memory through the action of the WET pulse as defined by the equation shown in FIG. 2. If ACT is a ZERO and $\overline{ACT}$ is a ONE then a digital zero is returned to the threshold store from input 106 of multiplexer 100.

During output intervals after the current data has been read to the output, a PCM zero code is written into the output data store from the bus 124 input to multiplexer 66. The purpose of this is to leave the PCM zero code in the output data store. If the connection continues this code will be overwritten by the next sample. If the connection is broken and the channel thus becomes idle, then the PCM zero code will not be overwritten, and thus the PCM zero code will be transmitted over the idle channel until a subsequent connection is made. This feature reduces idle channel noise in the idle channel, and reduces crosstalk between the idle channel and other channels, but is not necessary for proper conferencing.

Because new speakers and new thresholds will be established at random times with respect to the fourth frame signal during which thresholds are decremented, a threshold may be decremented almost as soon as it is established or from one to three frames later, and then periodically each fourth frame thereafter until a new threshold is established or until the threshold reaches a zero.

In order to prevent too early decrementing of the threshold it was decided to decrement the threshold by one-half step. Accordingly, the 7 magnitude bits of the PCM sample on bus 64 are entered in the most significant 7 bit positions of the threshold store memory 76 through multiplexer 68 and also through multiplexer 68 a ONE is placed in the least significant bit position via lead 74. A similar shifting operation is performed at the input to the compare circuit 70 and a zero in the least significant bit position is input via lead 72. Thus, the threshold initially stored is one-half step larger than the source signal. This refinement in conjunction with the use of a one-half step values for −DELTA on bus 84 prevents excessive early reduction of the threshold value.

ANALOG IMPLEMENTATION

FIG. 4 illustrates that the concept of the present invention can be implemented utilizing analog switching techniques as well as digital techniques. FIG. 4 shows the type of circuitry required to implement a four-party conference circuit for each of four conferees A, B, C, and D. The circuit shown selects a signal to be sent to conferee A from the signals received from conferees B, C and D. Three other similar circuits would be required to select signals for B, C, and D; from the signals of A, C and D; A, B, and D; and A, B, and C, respectively.

This circuit illustrates three conferees B, C and D supplying input analog signals on lines 130, 132 and 134. This information is passed through the conferencing circuitry to an output line 136 for a fourth conferee A. The input signals are supplied through rectifiers 138, 140 and 142 to the positive inputs of differential amplifiers 144, 146 and 148, respectively. The rectifiers previously mentioned include lowpass filtration so that the output follows the envelope of the analog signal. The outputs of the differential amplifiers are supplied to AND gates 150, 152 and 154, respectively. The differential amplifiers produce a logic 1 output when the input labeled (+) is positive with respect to the input labeled (−), and a logic 0 output when that is not the case. The inputs from the various rectifiers are supplied to the control lead of each of the analog switches 156, 158 and 160. The outputs of each of these switches are connected together in a common lead 162 to the input of an isolation amplifier 164 whose output is connected on a lead 166 to the negative input of each of the differential amplifiers 144, 146 and 148. The second inputs of each of the AND gates is connected to one of three periodic pulsed signals, P1, P2 and P3. An illustration of their respective timing is provided in FIG. 4 as well. Outputs of the AND gates are connected to the control lead inputs of the corresponding analog switches and also connected to the corresponding set inputs of a plurality of set-reset flip-flop circuits 168, 170 and 172. The output of AND gate 150 is also connected to one input of an OR gate 174 as well as to one input of an OR gate 176. An output of OR gate 174 is connected to a reset input of flip-flop 170 while an output of OR gate 176 is connected to a reset input of flip-flop 172. An output of the AND gate 152 is connected additionally to a second input of OR gate 176 as well as to an input of OR gate 178. Finally, the AND gate 154 is connected to further inputs of the OR gates 174 and 178. Outputs of the three flip-flops 168, 170 and 172 are connected to the control leads of respective analog switches 180, 182 and 184. The inputs of these switches are connected to the input leads 130, 132, 134 while the outputs of each of these analog switches 180, 182 and 184 are connected in common to the output lead 136 to conferee A.

The analog switches in each case are illustrated as an insulated gate field effect transistor with the control lead as the gate and the remaining two terminals the input and output. The intent is that the input shall be connected to the output when the control signal is at logic ONE and that there shall be no connection with the control input at logic ZERO. Those skilled in the art will recognize that for certain logic voltage levels, and signal levels insulated gate field effect transistors could in fact be utilized as the analog switches while in other cases another type of analog switch would be more suitable.

In operation, it may be assumed that conferee C commences providing the largest amplitude signal as compared to conferees B and D. It may be initially assumed that the integrating capacitor 163 is in an uncharged condition. Thus, any input signal on lead 132 after rectification in rectifier 140 will produce a larger signal at the positive input of amplifier 146 than is received on the negative input from unity gain isolation amplifier 164. The resulting logic 1 output in conjunction with timing pulse P2 causes AND gate 152 to turn on switch 158 during P2 and charge the integrating capacitor to a given value. This signal output from AND gate 152 will also set flip-flop 170 to provide a logic 1 input on the control lead of switch 182 and thus directly connect the input signal from 132 to the output 136. This same signal output from AND gate 152 will, through the action of the OR gates connected to the reset inputs of the remaining flip-flops 168 and 172 will store a logic 0 in each, thus opening analog switches 180 and 184. Since the integrating capacitor has a discharge or bleed resistor 165, the reference output used will continually decrease as a function of time. Thus, conferee C must provide larger peak inputs than either of conferees B and D in order to remain connected to conferee A. However, conferee C need not continuously provide a larger amplitude signal than established in the integrating capacitor in order to remain connected.

It will be noted that if another conferee such as B provides a larger signal than that stored on capacitor 163, the output of comparator 144 will cause an input to AND gate 150 and at the time of occurrence of timing Pulse P1 the resulting output pulse from gate 150 will set flip-flop 168 and reset flip-flops 170 and 172 resulting in the connection of input B, 130, to output 136 through switch 180, while providing a new charge for the integrating capacitor and thus a new reference for the remaining conferees to overcome in order to gain or regain the floor.

DETAILED DESCRIPTION OF FIGS. 5–7

The remaining figures are merely illustrative of the design used in typical blocks within FIG. 2. FIG. 5 is specifically the circuit used to implement the multiplexer 88. However, the same or very similar circuitry would be used for the other multiplexers such as 60 and 100. As will be noted, four of the one-of-two multiplexers in FIG. 5 are enclosed in a dash line. This four unit device is sold by Texas Instruments as P/N SN74157 and is called a quad two input multiplexer. The remaining two input multiplexer in FIG. 5 provides the circuitry required for multiplexer 88 of FIG. 2. The remainder of this partially illustrated quad two input multiplexer device might be used for other purposes or left unused.

FIG. 6 illustrates a plurality of exclusive OR gates which may be used to provide the comparison function of block 114 of FIG. 2.

While the function of block 114 is to provide an output just in case the two inputs are equal, the function of compare circuit 70 is to provide an output DECT indicative that the new data is greater than the output of the threshold memory. This function may be conveniently implemented using two, four bit magnitude comparator circuits, Texas Instruments Corp. P/N SN7485. Adder circuit 82 may be implemented utilizing primarily two four bit adder circuits, Texas Instruments Corp. P/N SN7483.

The various store circuits such as 76, 92, 38 and 94 may be any of a plurality of types of random access memories. FIG. 7 illustrates four random access memories which may be purchased under the part number SN7489, which are sixteen word by four bit random access memories. The inverters connected to the outputs of the random access memeories were required because the random access memories as utilized had inverted outputs and these outputs needed to be again inverted in this example. The resulting final outputs DATA OUT bits 0–7 correspond to bus 44 in FIG. 2. The write enable lead $\overline{\text{WED}}$, 120', is the inverse of the WED input on block 38 of FIG. 2, as these memories require a low level write enable signal. The address appearing on lead 96 of FIG. 2, is connected to the four low order inputs of all the RAM'S while the most significant address bit is used as a chip select signal. The eight data inputs would receive data from the multiplexer 66 in the FIG. 2.

The serial input to parallel output shift register 60 of FIG. 2 may be implemented using a device such as a Texas Instrument Corp. P/N SN 74164.

SUMMARY AND OTHER APPLICATIONS

Both a digital and an analog embodiment of an improved method for providing telephonic conferences have been presented. The method features a variable reference level which closely follows the peak amplitude of the loudest conferee, which is the speaker.

This reference level then provides a basis for distinguishing between not only the speaker and silent conferees, but between the speaker and speaker echos, which may be almost as large as the true speaker signal.

While the digital embodiment described above was a part of a time-space-time switching system, it will be realized that the same invention concept may be utilized in applications in which any switching function is provide separately from the conferencing. FIG. 4 illustrates this fact and illustrates that the method may be utilized to provide conferencing of signals in analog representation as well as digital representation. However, the method may be more useful in digital systems, and therefore extensive introductory material was provided in order to provide a full description of a digital embodiment.

Those skilled in the art will realize that in addition to the two embodiments presented here various modifications may be made to suit other applications. Two such modifications may be of particular interest.

First, although it is advantageous in some systems such as the digital switch discussed here, it is not necessary to utilize the invention to separately select a speaker for each conferee from the signals of the other conferees. Instead the signals of all conferees may be sent to a common embodiment of the invention and a single speaker selected. That speaker's signal is then used as the speaker for all conferees. This latter approach will be referred to as the common approach. In a superior version of this common approach implementation, the selected speaker receives either a zero signal, or the signal of the conferee which was the speaker prior to the present speaker while the other conferees all receive the speaker's signal.

The superior form of the common approach is adequately discussed in the patents cited above in conjunction with various speaker selection methods. An important object of the present invention is the realization of improved telephonic conferences through the use of the new variable reference level selection method disclosed here. This new speaker selection method yields superior results utilizing either the common approach or the alternative approach; however, the embodiments presented here utilize the alternative approach.

The alternative approach itself appears to be a novel and important invention which permits a number of physically separate conference circuits in the various switching modules or levels to provide that portion of the conference function which is required for the conferees connected to each level without any necessity for interaction between levels except for the normal switching functions, which are required whether or not conferencing is implemented. The known prior art teaches the use of one or more conference circuits not fully integrated with the normal switching functions and which may require special control actions to complete conference calls.

The alternate approach utilized here permits, for example, the addition of a third party to an existing two-party call by simply adding four additional connections without rearranging the existing connections. A party may similarly be dropped from a conference call by simply deleting the appropriate connections.

The alternative approach may be utilized either with the improved speaker selection method presented here or with certain previously available methods. Similarly, the improved method of speaker selection utilizing a variable reference level may be utilized with either the common or alternative approach.

Second, those skilled in the art will also recognize that it may be desirable to prefilter or otherwise process the inputs prior to input to the invention. In some cases then, the selection and updating of the threshold may be done not on the basis of signal amplitude directly, but may utilize some less direct measure of signal size such as root mean square value, for example, This was previously mentioned in conjunction with the explanation of FIG. 4 in which it was mentioned that the blocks identified as "rectifier" would also include a lowpass filter.

It is, therefore, our intention that we be limited not to either of the specific embodiments illustrated and described but rather to the invention wherein what is claimed is:

1. The method of determining which of a plurality of source derived input signals should be delivered to an output as a destination signal in a time frame comprising, the steps of:
    sampling a characteristic indicative of magnitude for each of the source signals;
    storing the magnitude sampled as a new reference whenever the present sample magnitude exceeds a previous reference;
    decreasing the magnitude of the reference as a function of time; and
    directing to the output, as a destination signal, only the input signals obtained from the source last used to establish the reference magnitude.

2. Apparatus for determining which source of a plurality of source derived input signals should be used for providing an output signal to a destination at the end of each of a plurality of time frames comprising, in combination:
    means for periodically sampling the magnitude of the signals for each of said sources;
    means, connected to said last named means, for storing the magnitude of a sampled signal as a new reference whenever the magnitude of the sampled signal exceeds the amplitude of a previously established reference;
    means, connected to said means for storing, for decreasing the magnitude of the reference as a function of time; and
    means, connected to said means for storing, for presenting at the output each time frame only the signals supplied by the source most recently used to establish the reference magnitude.

3. The method of conferencing a plurality of conferees wherein it is desirable that each conferee receive signals from only one of the other conferees which one is designated as a communicating conferee, during each time frame of a communication comprising the steps of:
    comparing the magnitude of each of the received signals with a reference magnitude;
    decreasing the magnitude of the reference as a function of time;
    passing only the largest signal received in a time frame to the receiving conferee when the magnitude of at least one incoming signal exceeds the reference magnitude; and
    designating the conferee having the signal which last sets a new reference magnitude in a given time frame as the communicating conferee during each time frame in which the incoming signals do not exceed the reference magnitude.

4. The method of claim 3 comprising the additional steps of:
    storing an indication of activity during each comparison; and
    erasing the indication of activity each time signals are passed to a receiving conferee.

5. Apparatus for conferencing a plurality of conferees wherein each conferee receives signals from only one of the other conferees (the speaking conferee) at a time comprising, in combination:
    means for comparing the magnitude of each of the signals received from each of the remaining conferees with a stored reference signal magnitude;
    means, connected to said means for comparing, for decreasing the magnitude of the reference as a function of time;
    means, connected to said means for comparing, for outputting only the largest signal received in a time frame to the receiving conferee when the magnitude of at least one incoming signal exceeds the reference;
    means, connected to said means for comparing, for designating the conferee having a signal most recently used to set a new signal reference magnitude in a given time frame as the speaking conferee until a new reference is set; and
    means, connected to said means for comparing, for outputting to the receiving conferees only the presently designated speaking conferee during each time frame which the incoming signals do not exceed the reference magnitude.

6. The apparatus of claim 5 comprising, in addition:
    means for storing an indication of activity in the communication channel used by the receiving conferee during each comparison of the received signal with the reference;

means, connected to said means for storing, for erasing the indication of activity at a predetermined time during each time frame; and means, connected to said means for storing and said means for comparing, for immediately decreasing the magnitude of the reference to zero for a given communication channel whenever the activity bit for that channel is erased prior to the end of a given time frame.

* * * * *